United States Patent
Ye et al.

(10) Patent No.: US 11,967,087 B2
(45) Date of Patent: *Apr. 23, 2024

(54) DYNAMIC VISION SENSOR FOR VISUAL AUDIO PROCESSING

(71) Applicant: Sony Interactive Entertainment Inc., Tokyo (JP)

(72) Inventors: Xiaoyong Ye, San Mateo, CA (US); Yuichiro Nakamura, San Mateo, CA (US)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/046,902

(22) Filed: Oct. 14, 2022

(65) Prior Publication Data

US 2023/0068416 A1  Mar. 2, 2023

Related U.S. Application Data

(63) Continuation of application No. 16/871,901, filed on May 11, 2020, now Pat. No. 11,475,618.

(51) Int. Cl.

| | |
|---|---|
| *G06T 13/40* | (2011.01) |
| *G06F 18/21* | (2023.01) |
| *G06T 7/20* | (2017.01) |
| *G06T 7/246* | (2017.01) |
| *G06V 40/16* | (2022.01) |
| *G10L 25/30* | (2013.01) |
| *G10L 25/63* | (2013.01) |
| *G06V 40/18* | (2022.01) |

(52) U.S. Cl.
CPC ............. *G06T 7/246* (2017.01); *G06F 18/21* (2023.01); *G06T 7/20* (2013.01); *G06T 13/40* (2013.01); *G06V 40/171* (2022.01); *G06V 40/172* (2022.01); *G06V 40/174* (2022.01); *G10L 25/30* (2013.01); *G10L 25/63* (2013.01); *G06V 40/193* (2022.01)

(58) Field of Classification Search
CPC ......... G06T 13/40; G06T 7/20; G06V 40/174; G06V 40/171; G06V 40/172; G06V 40/193; G06K 9/6217; G10L 25/30; G10L 25/63

See application file for complete search history.

(56) References Cited

U.S. PATENT DOCUMENTS

| | | | |
|---|---|---|---|
| 11,203,292 B2 | 12/2021 | Lee et al. | |
| 11,490,092 B2 * | 11/2022 | Zhao | .......... H04N 7/0127 |
| 2013/0197859 A1 * | 8/2013 | Albano | .......... G10L 17/00 |
| | | | 702/150 |
| 2016/0026523 A1 | 1/2016 | Cohen et al. | |
| 2016/0360970 A1 | 12/2016 | Tzvieli et al. | |
| 2017/0312614 A1 | 11/2017 | Tran et al. | |
| 2018/0189581 A1 * | 7/2018 | Turcot | .......... G06V 40/166 |
| 2020/0342234 A1 | 10/2020 | Gan et al. | |
| 2021/0027761 A1 | 1/2021 | Witherspoon et al. | |

OTHER PUBLICATIONS

Olszewski et al., "High-Fidelity Facial and Speech Animation for VR HMDs", ACM Transactions on Graphics (TOG), 35(6), pp. 1-14, Dec. 5, 2016.

* cited by examiner

*Primary Examiner* — Antonio A Caschera
(74) *Attorney, Agent, or Firm* — John L. Rogitz

(57) ABSTRACT

To track certain difficult facial features during speech such as the corners of the mouth and the teeth, a camera sensor system generates RGB/IR images and the system also uses light intensity change signals from an event driven sensor (EDS), as well as voice analysis. In this way, the camera sensor system enables improved performance tracking (equivalent to using very high-speed camera) at lower bandwidth and power consumption.

20 Claims, 9 Drawing Sheets

LOGIC

TRAINING

- COMMON TIMESTAMP TO GET TEMPORAL MEASUREMENT RESULT
- USE EXPOSURE OF NORMAL CAMERA TO DETECT BRIGHTNESS

DYNAMIC VISION SENSOR FOR VISUAL AUDIO PROCESSING

FIELD

The application relates generally to technically inventive, non-routine solutions that are necessarily rooted in computer technology and that produce concrete technical improvements.

BACKGROUND

When executing facial tracking during speech to identify speakers in a noisy environment, or to detect fake videos, or for speech recognition to resolve ambiguity, or for animation, or for other purposes, some parts of face such as dark areas inside the mouth, teeth, and the quick motion of facial structures during speech pose challenges to precise tracking.

SUMMARY

The technical challenge posed by the above is that for better operation, high speed cameras may be required to reduce latency and improve tracking performance, requiring increased camera data framerates, yet such higher framerates requires higher bandwidth and processing and, thus, a relatively large consumption of power and generation of heat.

To address the challenges noted herein, a camera sensor system is provided that includes not only sensor cells with both light intensity photodiodes under color and if desired infrared filters to capture RGB and IR images, but also an event driven sensor (EDS) sensing cells which detect motion by virtue of EDS principles. EDS uses the change of light intensity as sensed by one or more camera pixels as an indication of motion. EDS has a high dynamic range (HDR), no motion blur, and low latency compared to RGB cameras. When EDS information is fused with RGB camera information and audio information, tracking is made more robust. In conditions of fast motion (e.g., of the mouth) or HDR, EDS information may be relied on relatively more than in conditions of slow motion and fine detail (color, texture), in which conditions camera images are relied on more. Such fusion also can apply to face tracking, eye tracking, and emotion recognition.

Present principles use raw events data from an EDS to fuse with RGB camera and audio data and then input to a classifier. The classifier is trained using a training set of all three inputs from audio/camera/events data, in some implementations using a recurrent neural network with convolutional layers.

Accordingly, an assembly includes at least one camera unit configured to generate red-green-blue (RGB) images of a face. The assembly further includes at least one event driven sensor (EDS) configured to output signals representing changes in illumination intensity of the face. At least one microphone is configured to output signals representing speech. Moreover, the assembly includes at least one processor configured with executable instructions to receive signals from the camera unit, the EDS, and the microphone. The instructions are executable to execute at least one neural network to generate, based on the signals from the camera unit, the EDS, and the microphone, at least one of: emotion prediction, tracking of at least a portion of the face.

In some examples the camera unit is configured to generate infrared (IR) images.

In example implementations the camera unit, processor, and EDS may be disposed on a single chip.

In non-limiting embodiments the portion of the face being tracked may be one or more eyes and specifically one or more pupils, and may be limited to the pupils or may include other facial features. In other embodiments the portion comprises corners of the mouth and may be limited to the corners of the mouth and/or interior of the mouth including the teeth, or may include additional facial features as well.

In another aspect, a system includes at least one camera unit configured to generate red-green-blue (RGB) images and/or infrared (IR) images of a person. The system also includes at least one microphone and at least one event driven sensor (EDS) configured to output signals representative of the person. The system further includes at least one processor programmed with instructions to process output of the microphone using a short term Fourier transform (STFT) and process output of the STFT using at least one audio processing convolutional neural network (CNN). The instructions are executable to process at least features in images from the camera unit using at least one visual processing CNN. Furthermore, the instructions are executable to process representations of output signals from the EDS using at least one event processing CNN. The instructions in the system can be executed to fuse outputs of the CNNs in fully connected neural network layers to generate one or more of a prediction of emotion of the person, tracking of at least a portion of the face of the person, at least one virtual reality (VR) image of the person, and an identification of the person.

In one example of this latter aspect, the processor can be configured with instructions to process outputs of the CNNs using a recurrent neural network (RNN), and process output of the RNN using the fully connected neural network layers to generate mouth tracking of the person.

In another aspect, a method includes receiving signals from at least one camera unit, receiving signals from at least one event-driven sensor (EDS), and receiving signals from at least one microphone. The method includes executing at least one neural network to generate, based on the signals from the camera unit, the EDS, and the microphone, at least one of: emotion prediction, tracking of at least a portion of the face, identification of a person, generating a virtual reality (VR) image of the person.

The details of the present application, both as to its structure and operation, can best be understood in reference to the accompanying drawings, in which like reference numerals refer to like parts, and in which:

DETAILED DESCRIPTION

Figure 1:
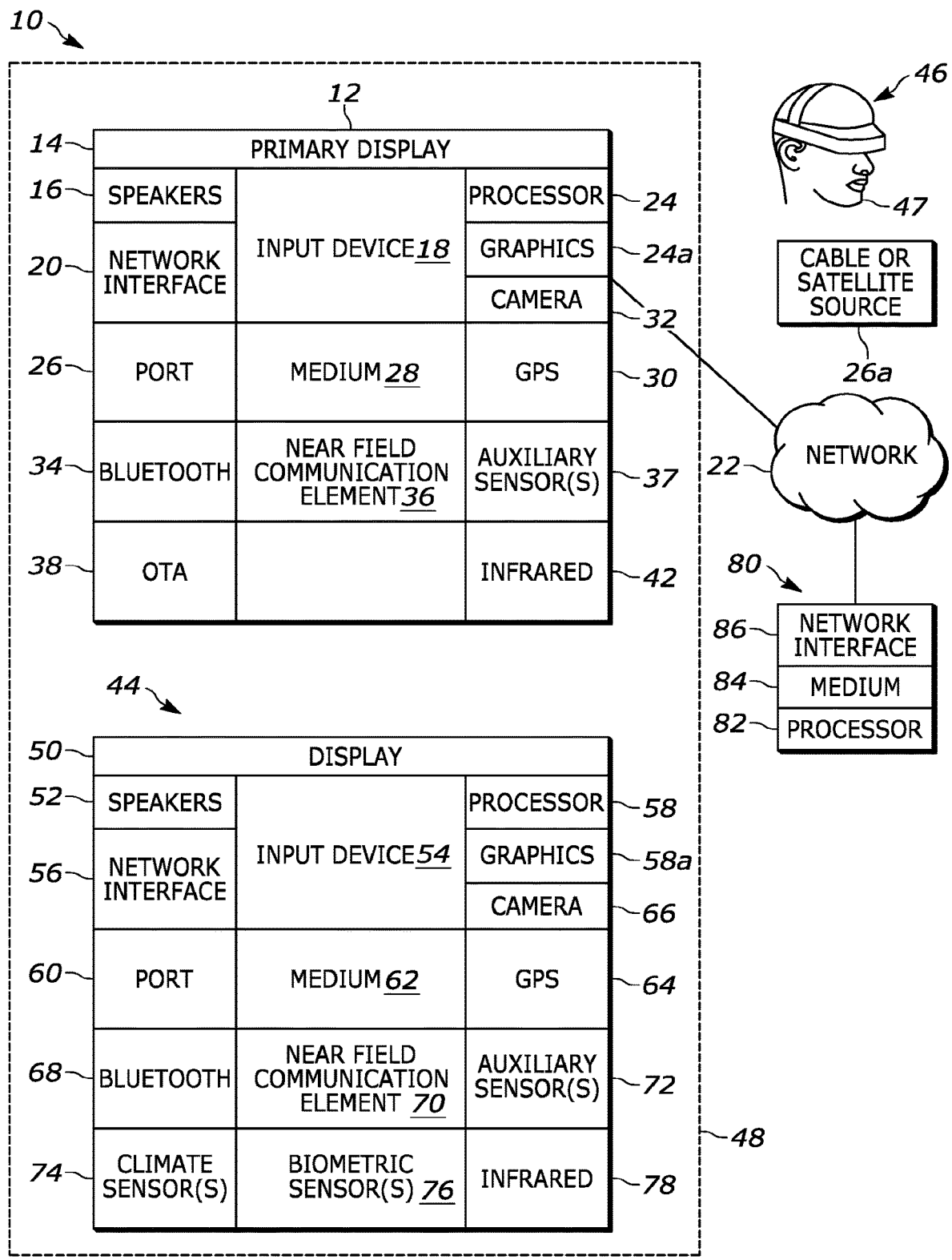
FIG. 1 is a block diagram of an example system including an example in accordance with present principles.

This disclosure relates generally to computer ecosystems including aspects of consumer electronics (CE) device networks such as but not limited to computer simulation networks such as computer game networks as well as standalone computer simulation systems. A system herein may include server and client components, connected over a network such that data may be exchanged between the client and server components. The client components may include one or more computing devices including game consoles such as Sony PlayStation® or a game console made by Microsoft or Nintendo or other manufacturers of virtual reality (VR) headsets, augmented reality (AR) headsets, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to Java, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). However, the AVD 12 alternatively may be an appliance or household item, e.g. computerized Internet enabled refrigerator, washer, or dryer. The AVD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g. communicate with other CE devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as e.g. an audio receiver/microphone for e.g. entering audible commands to the AVD 12 to control the AVD 12. The example AVD 12 may also include one or more network interfaces 20 for communication over at least one network 22 such as the Internet, an WAN, an LAN, etc. under control of one or more processors 24 including. A graphics processor 24A may also be included. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVD 12 may also include one or more input ports 26 such as, e.g., a high definition multimedia interface (HDMI) port or a USB port to physically connect (e.g. using a wired connection) to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignment purposes described further below. The source 26a when implemented as a game console may include some or all of the components described below in relation to the CE device 44.

The AVD 12 may further include one or more computer memories 28 such as disk-based or solid state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVD 12 is disposed in conjunction with the processor 24. However, it is to be understood that another suitable position receiver other than a cellphone receiver, GPS receiver and/or altimeter may be used in accordance with present principles to e.g. determine the location of the AVD 12 in e.g. all three dimensions.

Continuing the description of the AVD 12, in some embodiments the AVD 12 may include one or more cameras 32 that may be, e.g., a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command, etc.) providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12.

Still referring to FIG. 1, in addition to the AVD 12, the system 10 may include one or more other CE device types. In one example, a first CE device 44 may be used to send computer game audio and video to the AVD 12 via commands sent directly to the AVD 12 and/or through the below-described server while a second CE device 46 may include similar components as the first CE device 44. In the example shown, the second CE device 46 may be configured as an AR headset worn by a player 47 as shown. In the example shown, only two CE devices 44, 46 are shown, it being understood that fewer or greater devices may be used.

In the example shown, to illustrate present principles all three devices 12, 44, 46 are assumed to be members of an entertainment network in, e.g., a home, or at least to be present in proximity to each other in a location such as a house. However, present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer or game controller, and accordingly may have one or more of the components described below. The first CE device 44 may be a remote control (RC) for, e.g., issuing AV play and pause commands to the AVD 12, or it may be a more sophisticated device such as a tablet computer, a game controller communicating via wired or wireless link with the AVD 12 and/or a game console, a personal computer, a wireless telephone, etc. The second CE device 46 may be implemented by a head-mounted display (HMD) or head-mounted camera (HMC).

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. A graphics processor 58A may also be included. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid-state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44. The CE device 44 may communicate with the AVD 12 through any of the above-described communication modes and related components.

The second CE device 46 may include some or all of the components shown for the CE device 44. Either one or both CE devices may be powered by one or more batteries.

Now in reference to the afore-mentioned at least one server 80, it includes at least one server processor 82, at least one tangible computer readable storage medium 84 such as disk-based or solid state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server or an entire server "farm", and may include and perform "cloud" functions such that the devices of the system 10 may access a "cloud" environment via the server 80 in example embodiments for, e.g., network gaming applications. Or, the server 80 may be implemented by one or more game consoles or other computers in the same room as the other devices shown in FIG. 1 or nearby.

The methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the internet.

Figure 2:
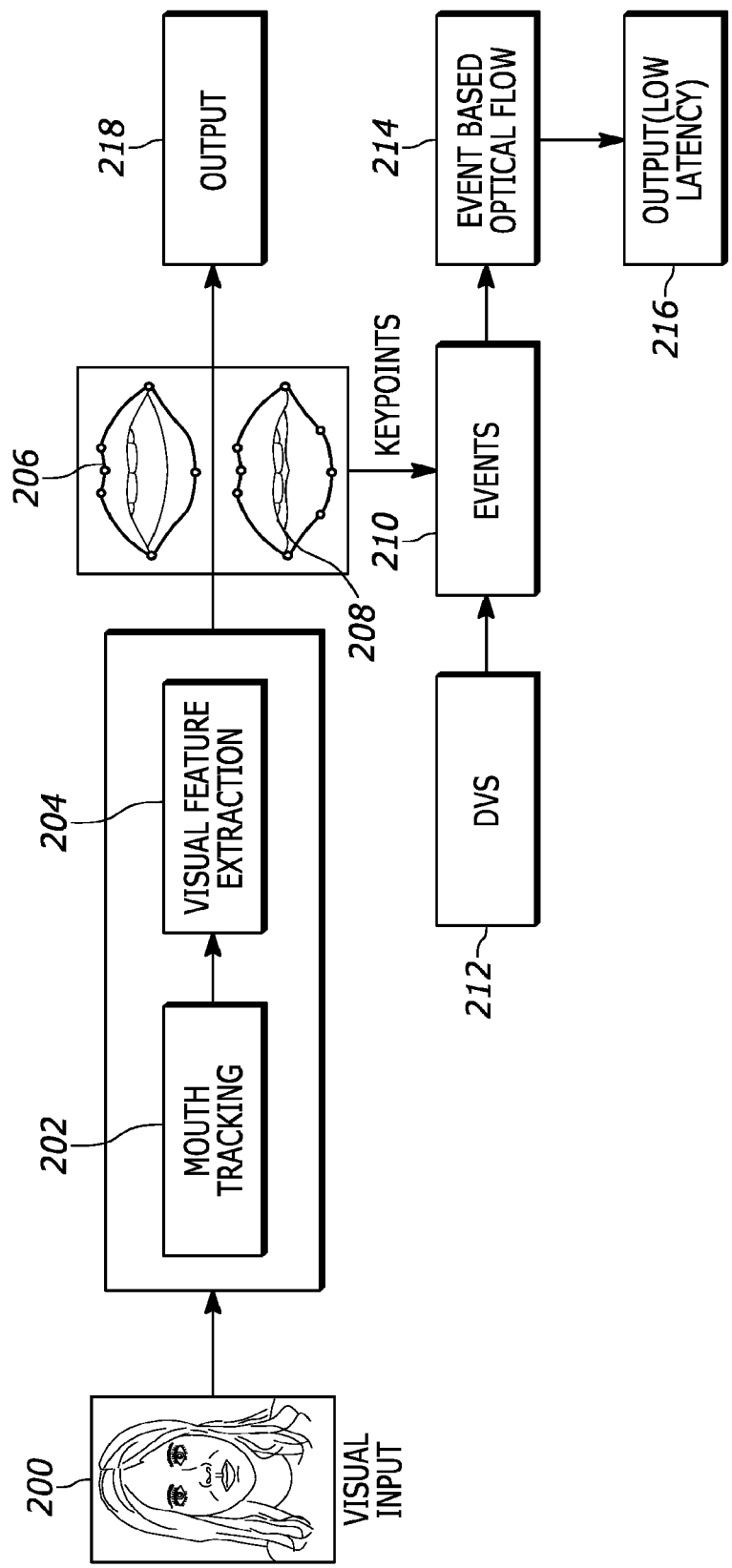
FIG. 2 illustrates a simplified sensor data flow.

FIG. 2 illustrates a visual input 200 from, e.g., a RGB camera that is used for mouth tracking 202 from which visual features 204 are extracted including lips 206 and areas 208 inside the mouth. The features 204 are augmented by keypoints from event signals 210 from dynamic vision sensor (DVS) 212 imaging the same person as imaged by the RGB camera and implemented according to event driven sensor (EDS) principles. The event signals 210 may be used to produce an event-based optical flow 214 that can be used for a low latency output 216 to augment an output 218 that may be used for, e.g., virtual animation of the person imaged at 200.

U.S. Pat. No. 7,728,269 and the "Dynamic Vision Platform" disclosing at https://inivation.com/dvp a combined monochrome intensity and DVS sensor camera from iniVation AG of Zurich, Switzerland, both incorporated herein by reference, may be referenced in implementing these sensors.

An EDS consistent with the present disclosure provides an output that indicates a change in light intensity sensed by at least one pixel of a light sensing array. For example, if the light sensed by a pixel is decreasing, the output of the EDS may be −1; if it is increasing, the output of the EDS may be a +1. No change in light intensity below a certain threshold may be indicated by an output binary signal of 0.

Figure 3:
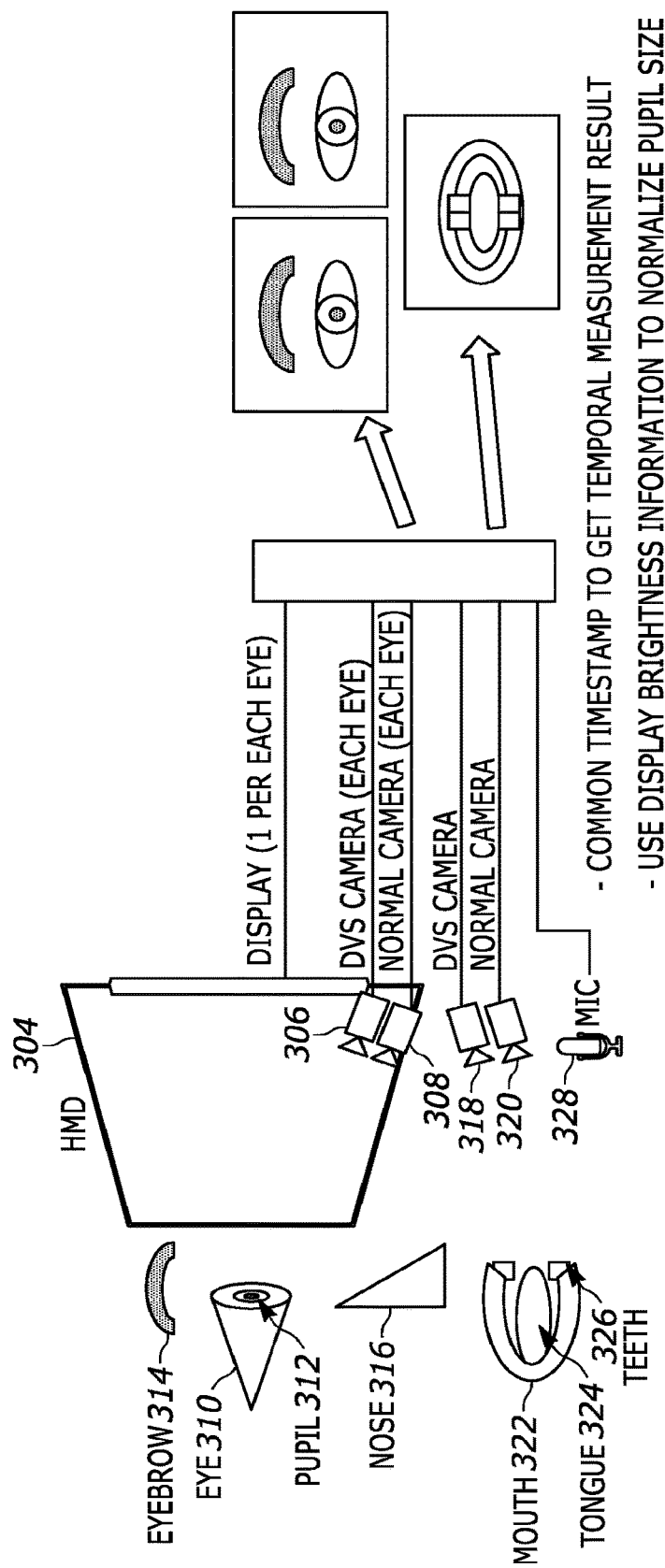
FIG. 3 illustrates sensors in relation to a person's face being tracked.
Figure 3:
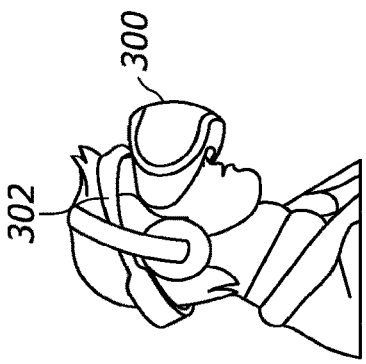

FIG. 3 illustrates further. A virtual reality (VR) and/or augmented reality (AR) head-mounted display (HMD) 300 that may be worn by a person 302 may incorporate any of the components shown in FIG. 1 and described herein. In the example shown the HMD 300 may include a display 304 such as a partially transparent AR display or opaque VR display. The HMD 300 also may include left and right eye DVS cameras 306 and left and right eye RGB cameras 308 to image the eyes 310 including pupils 312 of the person 302, as well as to image the eyebrows 314 and nose 316 of the person.

Furthermore, the HMD 300 may include a mouth-imaging DVS 318 and RGB camera 320 oriented to image the mouth 322 of the person 302, including the tongue 324 and teeth 326. Also, the HMD 300 may include at least one microphone 328 to detect speech of the person 302.

As indicated by the representation 330 the sensors described above output signals that may be time-stamped to output the representation 330 of the face of the person 302.

Display brightness information may be used to normalize the size of the pupils 312 as imaged.

Figure 4:
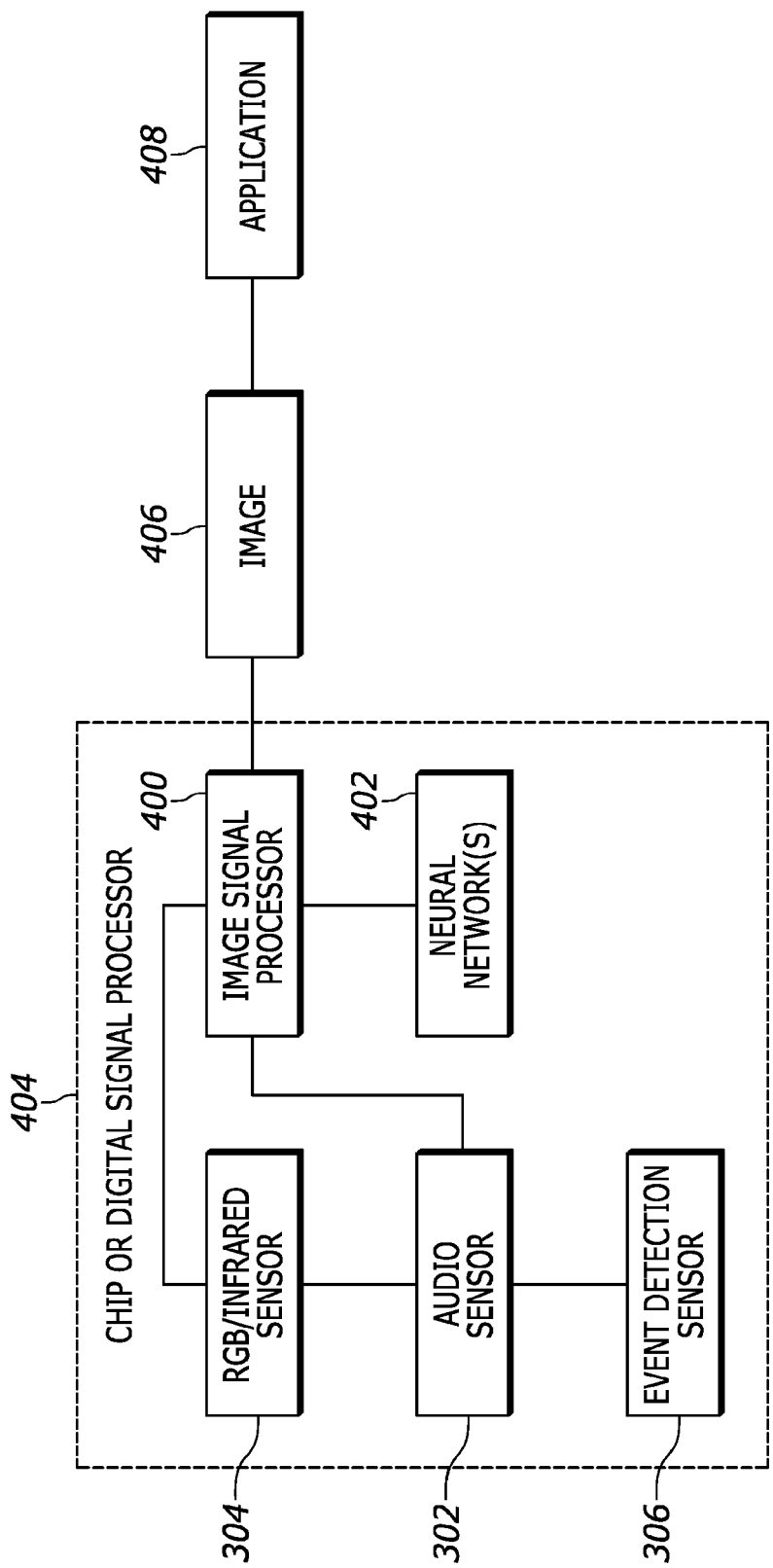
FIG. 4 illustrates an example system in block diagram format.

FIG. 4 illustrates an example implementation using the sensors shown in FIG. 3. In the example shown, the audio sensor 302, RGB sensor 304, and DVS 306 send signals to a processor such as may be implemented by an artificial intelligence (AI) chip 400 executing an algorithm such as one or more neural networks (NN) 402. The outputs of the sensors 302, 304, 306 are fused together and processed by the NN 402 and an output label representing, e.g., emotion or speech is sent to a computer game or other application 408. Note that audio signals from the audio sensor 302 may be first processed by an audio digital signal processor (DSP) prior to input to the NN 402, and similarly output from the DVS 306 may be processed appropriately prior to input to the NN 402. Non-machine learning algorithms also may be executed.

In the example shown, the sensors 302-306 and processor 400 are all implemented on a single chip 404 that may include local memory for storing images including images. The processing of the components may be executed by a single digital signal processor (DSP). In any case, the processor 400 outputs labels to one or more external applications 406, such as VR object generation algorithms, etc.

Figure 5:
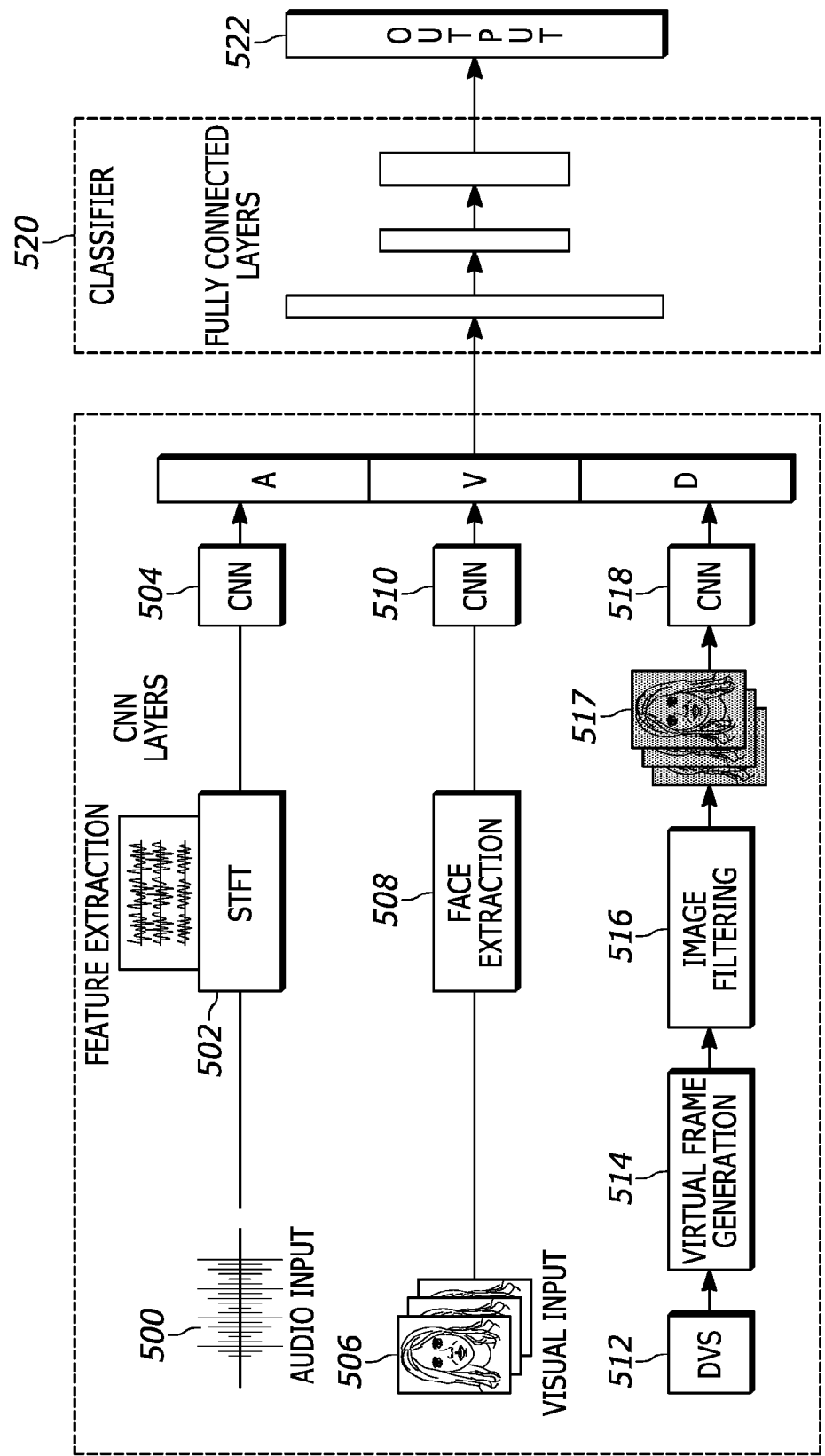
FIG. 5 illustrates data flow from RGB input, audio input, and EDS input for emotion recognition or speaker recognition.

FIG. 5 illustrates further details consistent with FIGS. 1-4. In FIG. 5, audio input 500 from the microphone(s) described herein is sent to a short term Fourier transform (STFT) 502 for conversion into frequency domain. The STFT 502 outputs signals to one or more audio processing convolutional neural networks (CNN) 504.

Visual input 506 from the RGB camera(s) described herein is sent to an image recognition engine 508 to extract facial features such as any of the features described above. The output of the engine 508 is sent to one or more visual processing CNN 510.

EDS input from a DVS 512 such as any of the DVS(s) described herein is sent to a frame generator 514 to generate low latency, high data rate virtual frames, which are sent to an image filter 516 to filter the virtual frames. The output 517 of the filter 516 is sent to one or more event processing CNN 518.

As shown in FIG. 5, the outputs of the CNNs 504, 510, 518 are sent to fully connected layers 520 which together with the CNNs establish a classifier. The output 522 of the classifier may be used to detect emotion of the person being imaged (e.g., the person 302 in FIG. 3), to recognize the person by means of speaker recognition, etc.

The "fully connected layers" 520 are part of the network, in which all neurons connect to all neurons in the next layer. The classifier includes the CNNs for feature vector extraction. The "fully connected layers" is in the very end to give the output labels. Essentially the fully connected input layer receives the output of the CNNs and "flattens" them into a single vector that is input to the next stage. The fully connected layers applies weights to features to predict labels and give probabilities for each label.

Figure 6:
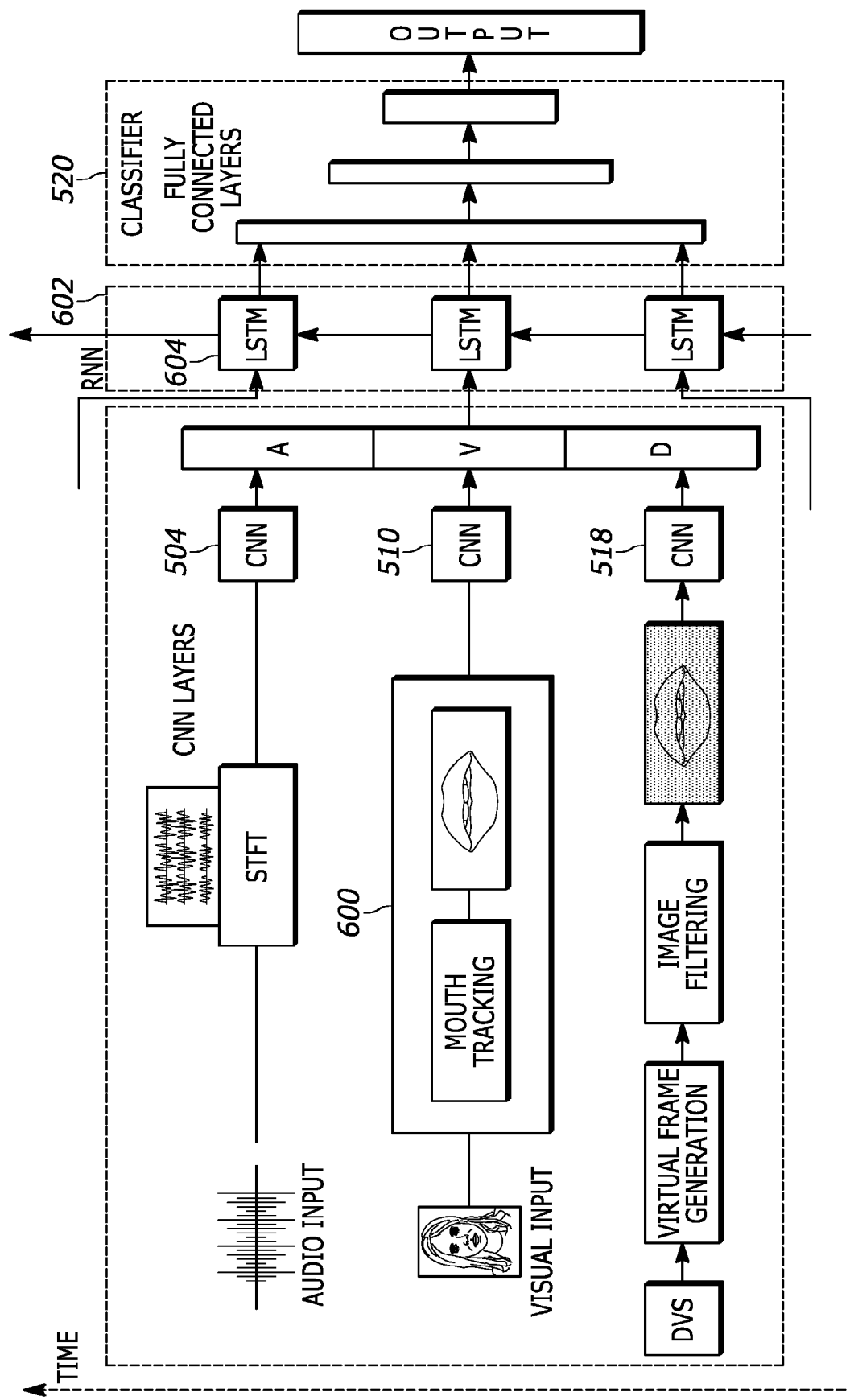
FIG. 6 illustrates an alternative classifier architecture for speech recognition.

FIG. 6 illustrates an alternate architecture that uses the components described in FIG. 5 up to the CNNs 504, 510, and 518 for tracking the mouth 600 of the subject person, except that a recurrent neural network 602 that may include one or more long short term memories (LSTM) 604 receives the outputs of the CNNs and then outputs signals to the full connected layers 520. The RNN 602 provides temporal information encoding.

The architecture of FIG. 6 fuses raw event data from DVS(s) with RGB camera and audio data as input to a classifier to overcome the effects of motion blur, inside-the-mouth areas that are difficult to image with an RGB camera, different lightning conditions, hard-to-image teeth, and fast mouth movement.

Note that the architecture of FIG. 5 is particularly although not exclusively useful for emotion recognition of the person in which processing ½ frame images with a short time period audio is sufficient to recognize emotion. FIG. 6 on the other hand adds the RNN 602 to give the classifier temporal memory which is useful for audio-visual speech recognition. FIG. 6 can thus provide the same functionality as FIG. 5, with an added RNN for temporal information.

Figure 7:
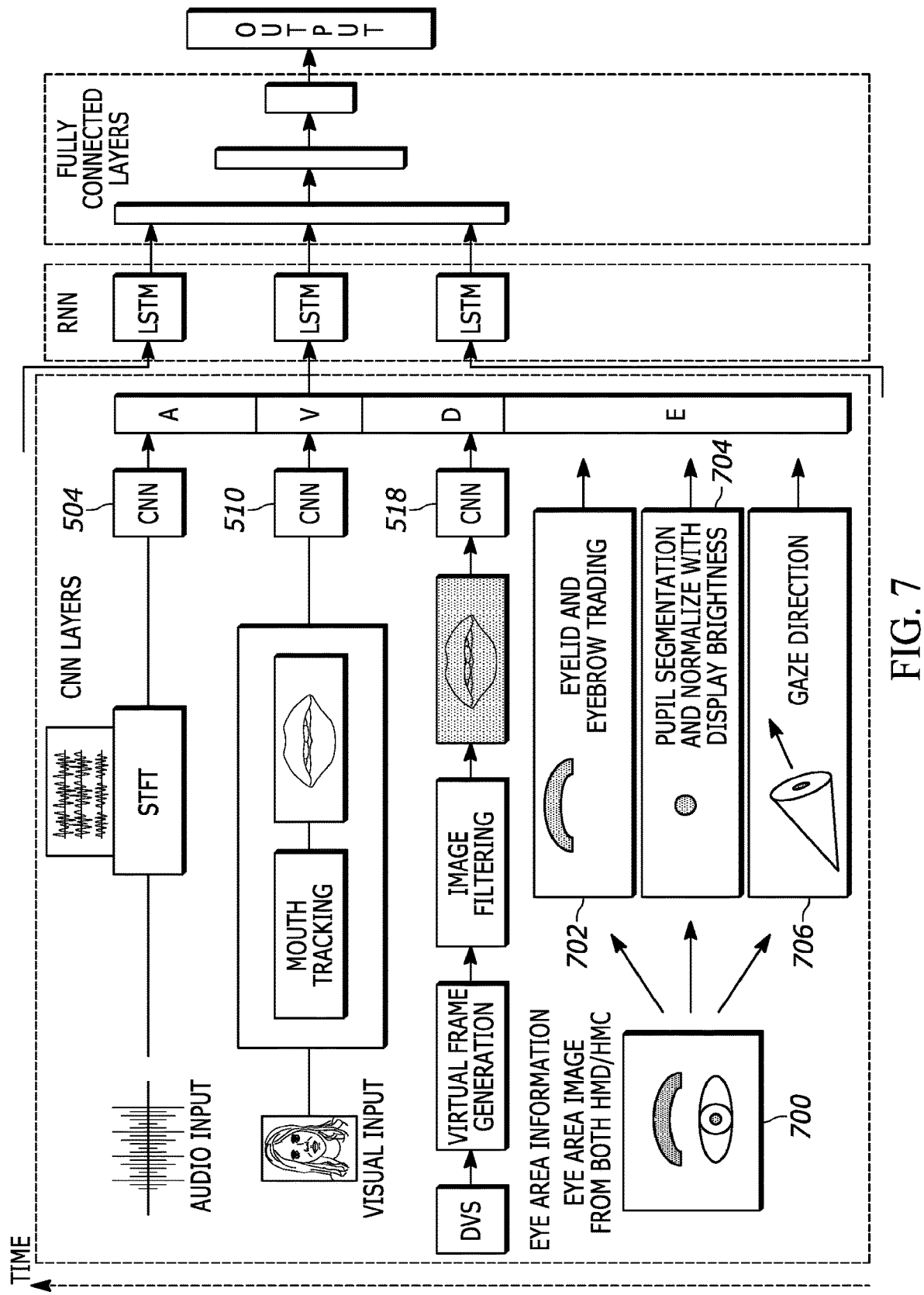
FIG. 7 illustrates face tracking information from a camera on a head-mounted display (HMD) or heard-mounted camera (HMC)

FIG. 7 provides further illustration of the CNN layers embodiments of FIGS. 5 and 6 in terms of imaging the eye area. An eye image 700 is produced by either or both of the HMD 300 shown in FIG. 3 or the HMC described elsewhere herein. From the image, eyelid and eyebrow features 702 are extracted, as are pupil segmentation 704 (normalized for display brightness) and gaze direction 706. Use of the DVS facilitates a high dynamic range that can detect otherwise hard-to-detect structures in the mouth and that is fast so as to detect eyeball movement, lip/tongue/teeth movement, etc. These may be important attributes when estimating emotion of the person. The DVS image facilitates segmenting the eye image to detect eye vibration and segmenting the mouth image to detect lip/tongue/teeth and motions thereof.

Figure 8:
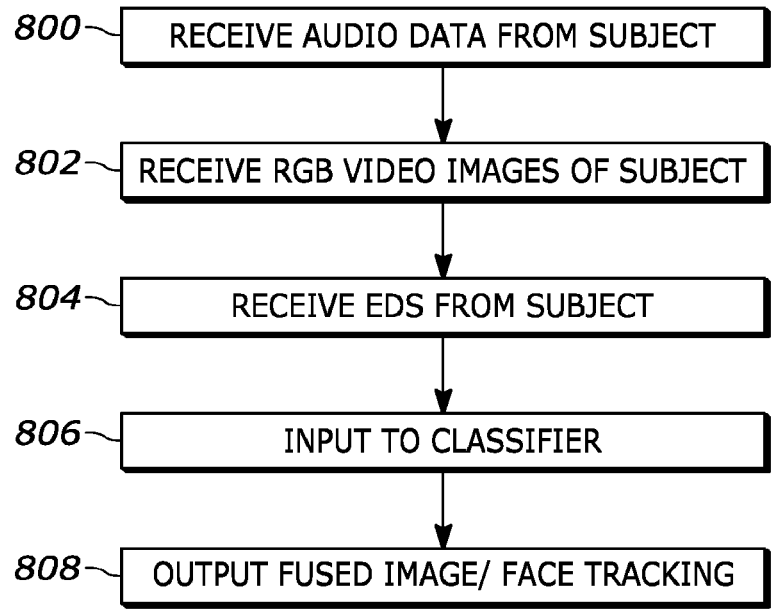
FIG. 8 illustrates example tracking logic in example flow chart format.

FIG. 8 illustrates example overall logic in example flow chart form. Audio is received from the person being imaged at block 800. RGB images are received block 802 from any of the cameras described herein and event information is received at block 804 from any of the DVS described herein. All three are input to any of the classifiers described herein at block 806, which outputs, at block 808, information useful in detecting emotion, mouth movement, eye movement, etc. for rendering a virtual image of the person or for other purposes including tailoring context to the emotion of the person.

Figure 9:
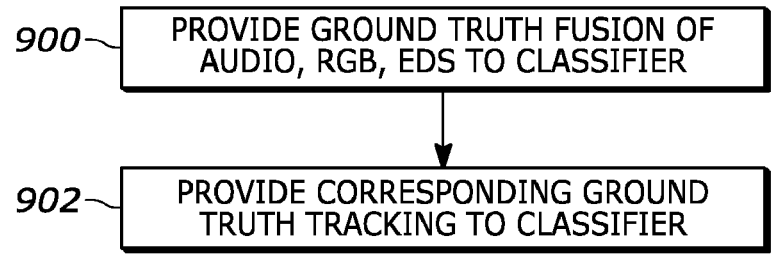
FIG. 9 illustrates example training logic in flow chart format.

FIG. 9 illustrates the classifiers herein may receive ground truth training set(s) at block 900 of audio, RGB images, and event signals. The ground truth training set may include audio/visual clips and EDS data, paired with output of labelled emotion or speech text output. Corresponding ground truth mouth tracking, emotion classification, eye tracking, etc. also is provided at block 902. With the training set, the classifier learns correct outputs from real data. The classifier may be trained using all three inputs (from audio/camera/events data), with the classifier including RNNs and CNNs in example embodiments.

Figure 10:
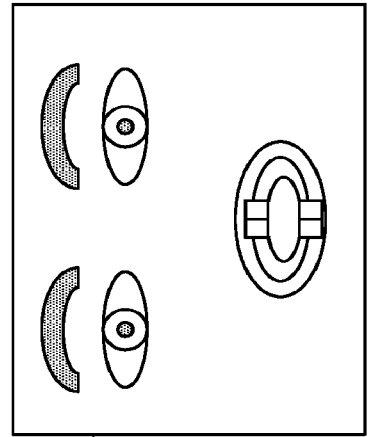
FIG. 10 illustrates an example HMC.
Figure 11:
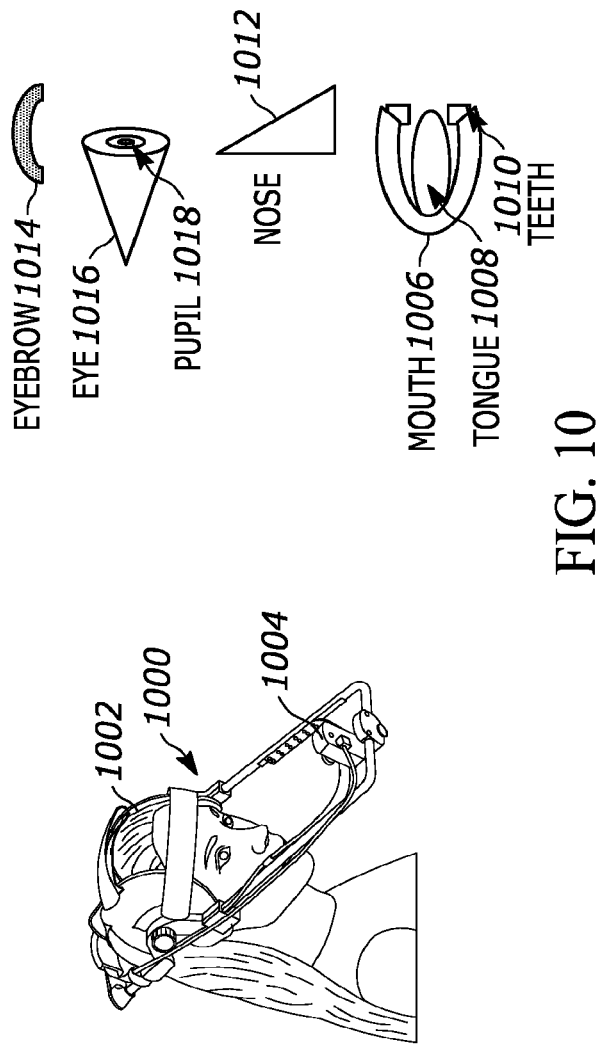
FIG. 11 illustrates .facial features being imaged by the HCM of FIG. 10.

FIGS. 10 and 11 illustrate that a HMC 1000 may be worn by a person 1002 with an inward-facing imaging assembly 1004 oriented toward the face of the person 1002 and spaced in front of the person, whose eyes are otherwise unimpeded from seeing the real world. The assembly 1004 produces RGB and DVS signals representing various portions of the face of the person 1002 including her mouth 1006 with tongue 1008 and teeth 1010, nose 1012, eyebrow 1014, and eye 1016 including pupil 1018.

As indicated in FIG. 11 the imaging assembly 1004 may include one or more DVS imagers 1100, one or more RGB cameras 1102, and one or more microphones 1104 consistent with principles described herein. The signals from the various sensors in the imaging assembly 1004 are timestamped so that they may be correlated with each other in time to produce an output 1106 representing the face (and voice) of the person 1002.

It will be appreciated that whilst present principals have been described with reference to some example embodiments, these are not intended to be limiting, and that various alternative arrangements may be used to implement the subject matter claimed herein.

What is claimed is:

1. An assembly comprising:
   at least one camera unit configured to generate images of a face;
   at least one event driven sensor (EDS) configured to output signals representing changes in illumination intensity of the face, the EDS providing an output of −1 responsive to intensity of light being sensed decreasing, +1 responsive to intensity of light being sensed increasing, and 0 responsive to a change in light intensity below a threshold;
   at least one processor configured with executable instructions to:
   receive signals from the camera unit and the EDS;
   execute at least one neural network to generate, based on the signals from the camera unit and the EDS at least one of: emotion prediction, tracking of at least a portion of the face.

2. The assembly of claim 1, wherein the camera unit is configured to generate infrared (IR) images.

3. The assembly of claim 1, wherein the camera unit, processor, and EDS are disposed on a head-mounted display (HMD).

4. The assembly of claim 1, wherein the instructions are executable to:
   execute the at least one neural network to generate, based on the signals from the camera unit and the EDS, emotion prediction.

5. The assembly of claim 1, wherein the instructions are executable to:
   execute the at least one neural network to generate, based on the signals from the camera unit and the EDS, tracking of at least a portion of the face.

6. The assembly of claim 5, wherein the portion comprises at least one eye pupil.

7. The assembly of claim 5, wherein the portion comprises corners of the mouth.

8. The assembly of claim 5, wherein the portion comprises the interior of the mouth including teeth.

9. A system comprising:
   at least one camera unit configured to generate images of a person;
   at least one event driven sensor (EDS) configured to output signals representative of the person, the EDS configured for providing an output of −1 responsive to intensity of light being sensed decreasing and +1 responsive to intensity of light being sensed increasing; and
   at least one processor programmed with instructions to:
   process at least features in images from the camera unit using at least a first machine learning (ML) model;
   process representations of output signals from the EDS using at least a second ML model; and
   fuse output of the ML models to generate at least one of:
   a prediction of emotion of the person,
   tracking of at least a portion of the face of the person,
   at least one virtual reality (VR) image of the person,
   an identification of the person.

10. The system of claim 9, wherein the processor is configured with instructions to:
    process outputs of the ML models using a recurrent neural network (RNN) comprising at least one long short-term memory (LSTM); and
    process output of the RNN using the fully connected neural network layers to generate mouth tracking of the person.

11. The system of claim 9, wherein the processor is configured with instructions to:
    generate a prediction of emotion of the person.

12. The system of claim 9, wherein the processor is configured with instructions to:
    generate tracking of at least a portion of the face of the person.

13. The system of claim 9, wherein the processor is configured with instructions to:
    generate at least one virtual reality (VR) image of the person.

14. The system of claim 9, wherein the processor is configured with instructions to:
    generate an identification of the person.

15. A method comprising:
    receiving signals from at least one camera unit;
    receiving signals from at least one event-driven sensor (EDS);
    executing, using at least one computer, at least one neural network to generate, based on the signals from the camera unit and the EDS at least one of: emotion prediction, tracking of at least a portion of the face, identification of a person, generating a virtual reality (VR) image of the person; and
    presenting on at least one display the at least one of: emotion prediction, tracking of at least the portion of the face, identification of the person, the VR image of the person, wherein
    the EDS is configured to provide an output of −1 responsive to intensity of light being sensed decreasing, +1 responsive to intensity of light being sensed increasing, and 0 responsive to a change in light intensity below a threshold.

16. The method of claim 15, comprising:
    executing at least one neural network to generate, based on the signals from the camera unit, the EDS, and at least one microphone, emotion prediction.

17. The method of claim 15, comprising:
    executing at least one neural network to generate, based on the signals from the camera unit, the EDS, and at least one microphone, tracking of at least a portion of the face.

18. The method of claim 17, wherein the portion of the face is the corners of the mouth and interior of the mouth.

19. The method of claim 15, comprising:
    executing at least one neural network to generate, based on the signals from the camera unit, the EDS, and at least one microphone, identification of a person.

20. The method of claim 15, comprising:
    executing at least one neural network to generate, based on the signals from the camera unit, the EDS, and at least one microphone, generating a virtual reality (VR) image of the person.

* * * * *